United States Patent [19]

Mossberg et al.

[11] Patent Number: 4,670,854

[45] Date of Patent: Jun. 2, 1987

[54] OPTICAL CROSS-CORRELATION AND CONVOLUTION APPARATUS

[75] Inventors: Thomas W. Mossberg, Cambridge; Yu-Sheng Bai; William R. Babbitt, both of Somerville, all of Mass.; Nils W. Carlson, Lawrenceville, N.J.

[73] Assignee: President and Fellows of Harvard College, Cambridge, Mass.

[21] Appl. No.: 781,539

[22] Filed: Sep. 30, 1985

[51] Int. Cl.[4] .......................... G06G 9/00; G06G 7/21; G02F 1/01; G02F 1/11

[52] U.S. Cl. .................................... 364/822; 364/807; 364/819; 350/353; 350/355; 350/358

[58] Field of Search ............... 364/819, 822, 862, 713, 364/807, 604, 837; 350/358, 161, 162.12, 169, 161.13, 161.14, 355

[56] References Cited

U.S. PATENT DOCUMENTS

| | | | |
|---|---|---|---|
| 3,388,402 | 6/1968 | Glazier et al. | 346/1 |
| 3,510,223 | 5/1970 | Lohmann | 356/71 |
| 3,585,393 | 6/1971 | Duguay | 250/217 |
| 3,631,713 | 1/1972 | Marom et al. | 73/67.3 |
| 3,809,873 | 5/1974 | Klahr | 235/181 |
| 3,873,181 | 3/1975 | Chivian et al. | 350/3.5 |
| 4,012,120 | 3/1977 | Kagiwada et al. | 350/161 |
| 4,084,880 | 4/1978 | Clow | 350/3.72 |
| 4,187,000 | 2/1980 | Constant | 350/162 SF |
| 4,354,247 | 10/1982 | Yao | 350/358 X |
| 4,357,676 | 11/1982 | Brown | 364/822 |
| 4,413,905 | 11/1983 | Holzapfel | 356/5 |
| 4,421,388 | 12/1983 | Berg et al. | 350/358 |
| 4,459,682 | 7/1984 | Mossberg | 365/119 |
| 4,462,046 | 7/1984 | Spight | 358/101 |
| 4,468,093 | 8/1984 | Brown | 350/162.12 |
| 4,544,229 | 10/1985 | Verber | 350/358 X |
| 4,544,230 | 10/1985 | Caulfield | 350/358 X |
| 4,558,925 | 12/1985 | Casseday | 350/358 |

OTHER PUBLICATIONS

Nakatsuka et al., "Multiple Photon Echoes in Molecular Iodine", Opt. Commun. 47, 65 (1983).

Mossberg, "Time-Domain Frequency-Selective Optical Data Storage," Optics Letters, 7, 77 (1982).

Carlson et al., "Temporally Programmed Free-Induction Decay", Phys. Rev. A30, 1572 (1984).

"Accuate Numerical Computation by Optical Convolution" Psaltis et al., 1980, International Optical Computing Conference.

Cole, "Incoherent Optical 1-Bit Cross Correlates for Radio Antenna Arrays" 1 Jul. 1980, *Applied Optics.*

Cole, "Spectial Analysis of a Temporal Signal with in Coherent Optics", 1 Jan. 1981, Applied Optics.

Friberg et al. "New Digital Photoelectric Correlator" Rev. Sci. Instrum. 2-1982.

Rhodes, "Acousto-Optic Signal Processing: Convolution and Correlation," Proc. IEEE, 69, No. 1, 65 (1981).

*Primary Examiner*—Jerry Smith
*Assistant Examiner*—Charles B. Meyer

[57] ABSTRACT

Cross-correlation or convolution or a succession of such operations is performed by exposing an inhomogeneously broadened material to optical radiation pulses modulated in accordance with the information to be cross-correlated or convoluted and detecting the resulting emitted radiation.

40 Claims, 10 Drawing Figures

OPTICAL CROSS-CORRELATION AND CONVOLUTION APPARATUS

This invention was made with Government support under Army Contract DAAG29-83-K-0040 and the Government has certain rights in the invention.

BACKGROUND OF THE INVENTION

This invention relates to convolving or cross-correlating segments of time-varying information.

In order to compare different information segments (for example, a time-dependent reference signal used in radar and a time-dependent echo signal received back from a distant object), it may be useful to convolve or cross-correlate the segments.

The convolution or cross-correlation can be performed by a digital computer if the time-varying information segments are already in the form of (or have been converted into) a succession of digital values.

In another technique, the segments can be converted to acoustic waves and propagated through a transparent solid; light scattered from the solid is then detected as a representation of the convolution or cross-correlation. The temporal response of such a system (and hence its processing rate) is governed by a number of factors including the frequency and propagation speed of the acoustic waves in the transparent solid.

SUMMARY OF THE INVENTION

The general feature of the invention is in performing the operations of cross correlation or convolution on one or more segments of information by modulating optical radiation to produce one or more information input pulses that are time varying in accordance with the respective information segments, exposing a material to the information pulses to cause it to emit cooperatively enhanced optical radiation, and detecting the emitted radiation as a representation of the result of said cross-correlation or convolution operations on the information pulses.

The preferred embodiments of the invention include the following features. The material has at least one inhomogeneously broadened optical transition, at least one of which is an absorption line. In the case of multiple transitions, the transitions are coupled and have correlated inhomogeneous broadening mechanisms and are of substantially the same bandwidth, to ensure high fidelity output signals. Each information pulse is resonant with one of the transitions and has time variations whose frequency components fall entirely within the inhomogeneous transition bandwidth of the resonant transition. The pulses occur in a time sequence and the temporally first input pulse is resonant with an absorption line. The material has homogeneous transition bandwidths within the various inhomogeneous bandwidths characterizing the material as a whole. In situations where the convolution or cross-correlation of two information segments is desired, the material is exposed to two information pulses, and a control input pulse which is resonant with one of the inhomogeneously broadened transitions of the sample and is sufficiently short to uniformly excite all atoms which interact with the information pulses. In particular, the control pulse must be shorter than the shortest temporal feature of any information pulses that are resonant with the same transition as the control pulse. The input pulses must excite transitions of the material so that cooperatively enhanced optical radiation (an echo output signal) is emitted. For example, among the possible three input pulse excitation schemes, the three pulses may excite the same transition, or pulse one (temporally designated) and pulse three may excite the same transition while pulse two excites a coupled transition. In the former (latter) case, the output signal occurs on the same transition as pulse one (two). The material is exposed to the input pulses in a predetermined sequence. In the case of a control pulse and two information pulses, when the control pulse appears temporally first (second or third) in the sequence, the emitted radiation represents the convolution (cross-correlation) of the two information pulses. The time interval between the beginning of the temporally first input pulse and the end of the temporally second input pulse does not significantly exceed the honogeneous dephasing time associated with the transition excited by the temporally first pulse. The temporally third input pulse follows the second within the frequency spectrum relaxation time of the material. The cooperatively enhanced optical radiation is discriminated from noise radiation by selective circular polarization and filtering. The input pulses are amplitude modulated. The information segment is time varying. The input optical radiation is produced coherently by a laser source, or in some embodiments is produced incoherently. When the two (three) segments of information are two (three) binary encoded values, the emitted radiation is an output pulse having a time dependent waveform corresponding to a mixed binary value that is the arithmetic product of the two (three) values. when only one information pulse and a control pulse are used the output signal is indicative of the auto-correlation (if the information pulse precedes the control pulse) or auto-convolution (if the information pulse follows the control pulse) of the information pulse. The brief control pulse can be replaced by two successive linearly frequency chirped pulses whose bandwidth is sufficiently broad to uniformly excite atoms within the material which are normally excited by the control pulse. The second chirped pulse has chirp rate twice that of the first chirped pulse.

The invention enables very high speed determination of cross-correlation or convolution optically, without the limitations of slower acoustic devices. Cross-correlation or convolution of any type of information can be performed by modulating optical radiation in accordance with the information. High-speed multiplication can also be done.

Other features and advantages of the invention will become apparent from the following description of the preferred embodiment, and from the claims.

DESCRIPTION OF THE PREFERRED EMBODIMENT

We first briefly describe the drawings.

Drawings

Structure

Figure 1:
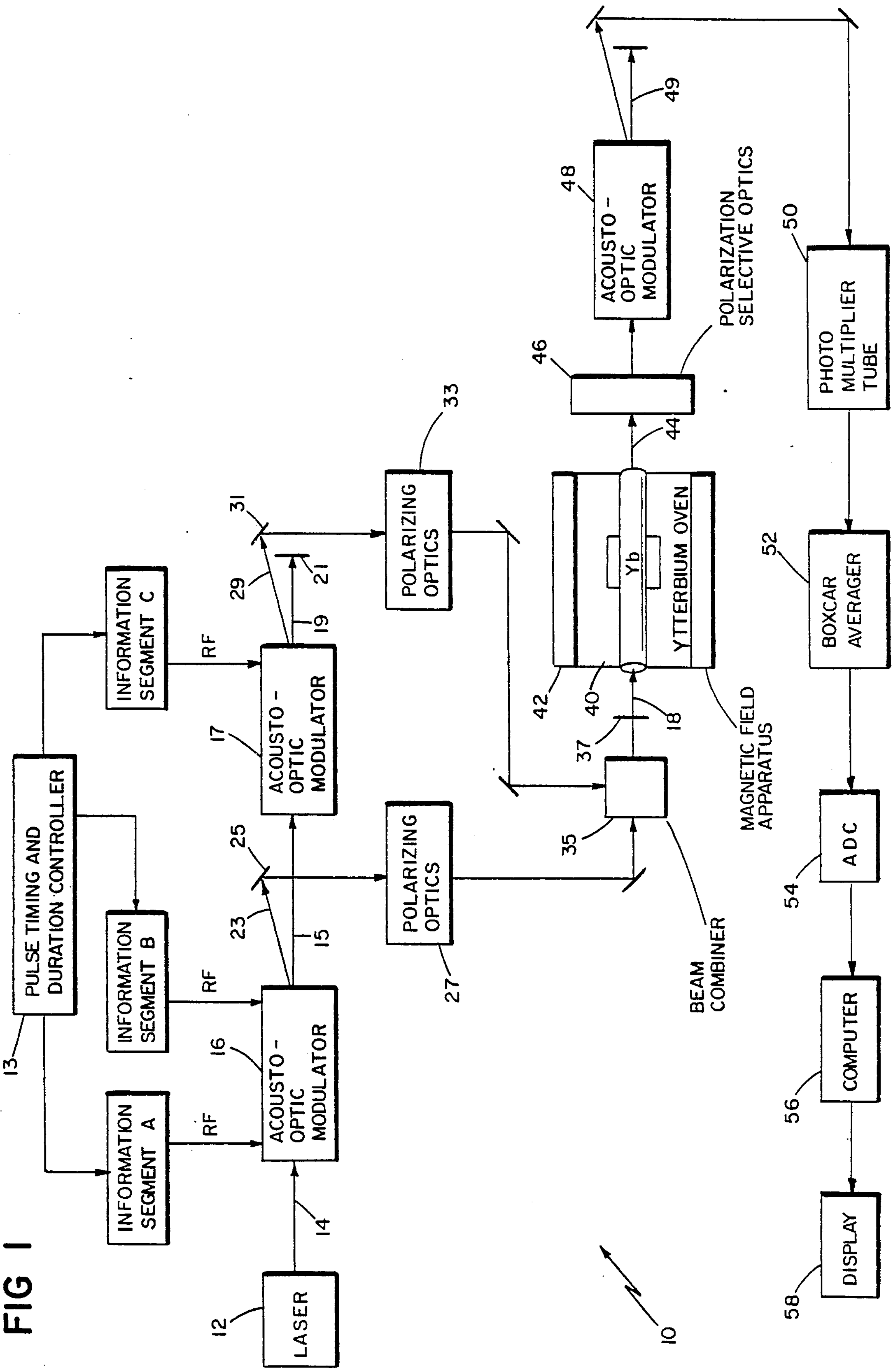
FIG. 1 is a block diagram of the cross-correlation or convolution apparatus.

Referring to FIG. 1, optical cross correlation and convolution system 10 has a continuous wave, single-frequency, tunable dye laser 10 pumped by an argon laser and tuned to operate at a wavelength of 555.6 nanometers. The output beam 13 of the laser is directed through a pair of acousto-optic modulators 16, 17.

Modulators 16, 17 modulate beam 14 to form three successive time-limited input pulses that are eventually combined and propagated in one direction on a roughly collimated 1.5 mm diameter directional beam 18. Two of the pulses are amplitude modulated in modulator 16 respectively in accordance with two time varying segments A and B of information to be cross-correlated or convolved. The third pulse is amplitude modulated in modulator 17 in accordance with a third time varying segment of information C. The amplitude modulation of each pulse is accomplished by applying to the modulator 16, 17 an RF signal which is itself amplitude modulated in accordance with the corresponding information segment. Modulators 16, 17 also control the time durations of the three pulses and the time delays between the pulses as directed by a pulse timing and duration controller 13. Each modulator accomplishes this by angularly diverting the beam to begin the pulse and permitting the beam to return to its original position to end the pulse. When the output beam of modulator 16 is in its original position, it passes through modulator 17. When the output beam of modulator 17 is in its original position 19 (i.e., when no pulses are being generated), it is terminated by a beam stop 21. When the output beam of modulator 16 is being diverted 23, it is reflected by a mirror 25 to pass through polarizing optics 27 which impose a linear polarization on the two pulses generated by modulator 16. Similarly, when the output beam of modulator 17 is being diverted 29, it is reflected by a mirror 31 to pass through polarizing optics 33 which imposes a linear polarization orthogonal to that imposed by polarizing optics 27. The three pulses are combined in a beam combiner 35 and propagated through a quarter wave plate 37 which converts the orthogonal linear polarizations of the beams into opposite circular polarizations, and then into an ytterbium oven 40.

Oven 40 is an evacuated stainless steel pipe two feet long and $\frac{3}{4}$ inch in diameter sealed at both ends with windows. The oven contains a small pallet of solid ytterbium metal and is surrounded by a heater that raises the internal temperature to 400° C. to vaporize the ytterbium (Yb). Magnetic field apparatus 42 imposes in the space within oven 40 a highly homogenous magnetic field (70G) that is oriented coaxially to the pulse propagation direction to separate into three sublevel components the triplet $P_1$ level of vaporized $^{174}$Yb isotope atoms. Modulators 16, 17 introduce small frequency shifts in the three pulses so that they are respectively resonant with transitions between the $^{174}$Yb ground state and the appropriate magnetically split triplet $P_1$ sublevel.

At some time following the delivery of the sequence of three input pulses, an output pulse of cooperatively enhanced optical radiation is emitted from oven 40 on a beam 44, which also carries the original three pulses. Beam 44 is propagated through polarization selective optics 46 (which blocks all pulses except the output pulse and the input pulse generated by modulator 17) and an acousto-optic modulator 48 which passes that input pulse through on a discarded beam 49 and diverts the output pulse to a fast photomultiplier tube 50. Tube 50 delivers a time dependent signal segment (whose amplitude tracks the varying amplitude of the output pulse) to a gated boxcar averager 52 which averages several thousand similar successive signals generated in the same way at a rate of 10,000 Hz in the process of recording each temporal point on the output waveform. Averaged signals are read by an A-to-D converter 54. Approximately $10^5$ similar signals are sampled in the process of recording an entire waveform. The resulting digital samples are stored in a computer 56. The digital samples, which represent a time segment of information corresponding to the convolution, or cross-correlation, or some combination thereof, of the three original segments A, B, and C, can then be displayed on a display device 58.

Taking relaxation into account, the output pulse ranges from 0.01% to 5% as intense as the input pulses. The total duration of a single iteration from the first input pulse to the output pulse is typically 3 $\mu$s.

Operation

The output pulse can be made to represent either a cross-correlation or convolution of two of the three segments A, B, and C, by appropriate control of the configurations of the three input pulses.

Figure 2:
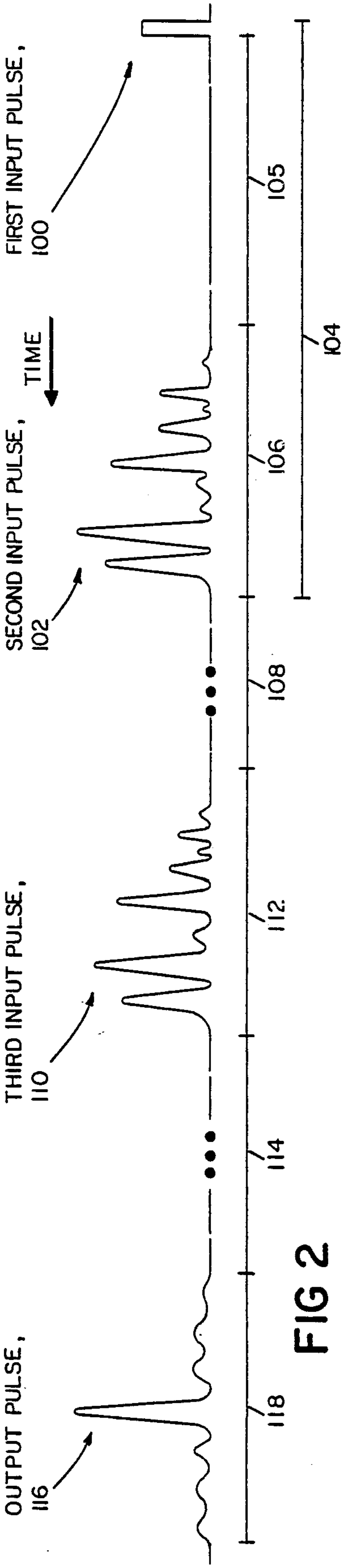
FIG. 2 is a time chart of input and output pulses (not to scale) of the apparatus of FIG. 1.

Referring to FIG. 2 (in which time passes from right to left), to obtain a convolution, for example, the first input pulse 100 (generated by modulator 16) is a brief control pulse shorter in time that the briefest temporal feature of interest in the information pulses, e.g., 18 to 25 nanoseconds. Pulse 100 is circuitry polarized and excites one Zeeman component of the Yb $(6s^2)^1S_0$–$(6s6p)^3P_1$ absorption line. The shape of pulse 100 is immaterial. The second input pulse 102 (generated by modulator 17) carries one of the information segments and excites a different Zeeman component of the same absorption line. The time 104 between the beginning of the first pulse and the end of the second pulse may be no longer than about $T_2$, the transverse relaxation time of the $^1S_0$–$^3P_1$ transition of $^{174}$Yb (i.e., 1 microsecond to 1.5 microseconds), which is essentially the same for all Zeeman sub-transitions. The delay 105 between the first pulse 100 and the second pulse 102 must be at least as long as the duration, 112, of the temporally third pulse 110 (generated by modulator 16); otherwise the output pulse may overlay the second information pulse 110. Pulse 102 could have a duration between, for example, 50 and 500 nanoseconds. Pulse 102 is circularly polarized with the opposite helicity of pulse 100. Following the second pulse 102, and after a delay 108, the third pulse 110 (which carries the second information segment) is delivered. This pulse excites the same Zeeman component as the temporally first pulse 100. Delay 108 could be any length longer than zero, provided that it is not longer than the time it takes for the frequency spectrum of Zeeman coherences within the $^3P_1$ excited state to become thermalized. The third pulse 110 has a time duration 112 that is about the same as the duration 106 of the second pulse. Duration 112 should be shorter than the transverse dephasing time of the $^1S_0$–$^3P_1$ transition. The third pulse 110 is polarized with the same helicity as the first pulse 100.

After an additional time delay 114 the output pulse 116 appears. Its time duration 118 is the sum of the durations of the three input pulses, which because of the brevity of the control pulse is essentially equal to the sum of the durations 106 and 112. The amplitude variation of pulse 116 is representative of the convolution of pulses 102 and 110.

The three input pulses produce the desired output pulse in the following manner.

The brief first pulse transfers a portion (e.g., about 50%) but not all of the population from the ground state of vaporized $^{174}$Yb, $(6s^2)^1S_0$, to the m=1 Zeeman level of the excited state, $(6s6p)^3P_1$. The amplitude of the m=1 Zeeman state reflects the Fourier transform of the first control pulse 100 (assuming that its intensity is sufficiently low that the material's response to it can be described as approximately linear). Before transverse relaxation of the $^1S_0$–$^3P_1$ transition destroys the correlation between the ground $^1S_0$ and excited $^3P_1$ (m=1) state amplitudes, the second pulse 102 is applied. Pulse 102 has a time varying waveform whose Fourier transform frequency spectrum falls within the inhomogeneously broadened bandwidth of the m=−1 Zeeman component transition of the $^1S_0$–$^3P_1$ transition. Its carrier frequency, like that of all of the input pulses, is adjusted so that it interacts with the same constituent Yb atoms as the carrier frequency of the first pulse 100 did. The intensity of the temporally second pulse 102 is adjusted so that for any particular frequency channel within the inhomogeneous bandwidth the fraction of population initially in one terminal level of the transition which is transferred to the other by the pulse is less than about one half. The population amplitudes transferred by the second pulse 102 reflect its Fourier transform. As a result, the coherence between the m±1 Zeeman levels corresponds to the product of the Fourier transforms of the first two pulses. Because the first pulse is relatively brief, its Fourier transform may be considered a constant so that, after the second pulse, the frequency distribution of the excited-state Zeeman coherence is in effect a stored version of the frequency spectrum of the second pulse. That distribution decays slowly and while it continues to persist, the third pulse is applied. The third pulse establishes an optical electric dipole polarization whose frequency distribution depends on the frequency distributions of the excited-state Zeeman coherences multiplied by the Fourier transform of the third pulse. Thereafter as time passes the respective frequencies of the electric dipoles evolve through different stages of coherence and the resulting cooperatively enhanced optical radiation produces the output pulse with a waveform whose temporal intensity represents the square of the convolution of the electric-field amplitude waveforms of the second and third pulses.

Cross-correlation, on the other hand, is accomplished, for example, by making the second pulse the brief one and encoding the information segments in the first and third pulses. In a manner similar to that described above, this input pulse sequence leads to the creation of an optical electric-dipole polarization. In this case, however, its frequency distribution depends on the Fourier transform of pulse one multiplied by the complex conjugate of the Fourier transform of pulse three. The output pulse then evolves as the cross-correlation of pulses one and three.

Generally it can be shown that for three laser pulses that are resonant with inhomogeneously broadened transitions as described above and have electric fields of the form $$E_p(r,t)=\epsilon_p(t-\eta_p)\cos[\omega_o(t-\theta_p)],$$

where p=1, 2, 3 identifies the pulse, $\epsilon_p(t)$ is a slowly time varying envelope function, $\eta_p=(\kappa_p\cdot r/c)+t_p$, where $\kappa_p$ is the unit wave vector of pulse p, and $t_p$ is the time that pulse p passes an arbitrary location r=0, then the output pulse has an electric field term $E_c(t)$ which is proportional to $$\int_{-\infty}^{\infty} E_1(\omega)E_2^*(\omega)E_3^*(\omega)e^{-i\omega t}d\omega$$

where $E_p(\Omega)$ is the Fourier transform of $E_p(r,t)$. The term $E_c(t)$ can be isolated from other coherent signals emitted by the material by controlling the polarization (as explained above) or the timing or direction of propagation of the input pulses.

If the first input pulse is short (and therefore its Fourier transform may be considered a constant), then $E_c(t)$ is proportional to $$\left[\int_{-\infty}^{\infty} \epsilon_2(u)\epsilon_3[(t-\eta_c)-u]du\right]\cos[\omega_o(t-\eta_c)] \quad (1)$$

which is a convolution of $\epsilon_2$ and $\epsilon_3$. If the second pulse is short, $E_c(t)$ is proportional to $$\left[\int_{-\infty}^{\infty} \epsilon_1[u-(t-\eta_c)]\epsilon_3(u)du\right]\cos[\omega_o(t-\eta_c)], \quad (2)$$

which is a cross-correlation of $\epsilon_1$ and $\epsilon_3$. Here $\eta_c=\eta_2+\eta_3-\eta_1$. When all three pulses have temporal structure, $E_c(t)$ represents the cross-correlation of pulse one with the convolution of pulses two and three.

Examples of input and output pulses are shown in Bai et al., "Real-time optical waveform convolver/cross correlator", App. Phys. Lett. 45 (7), 1 Oct. 1984, p. 714.

As explained in the article, to generate output pulses (called CORE signals in the article) of optimum intensity, one must employ pulse areas on the order of π radians. Unfortunately, the Fourier approximation which leads to Eqs. (1) and (2) becomes of questionable validity in this rather large excitation pulse area regime, and the authors expected that the predictions of Eq. (1) and (2) would become only approximate.

In order to test the predictions of Eqs. (1) and (2) under conditions where CORE signals intensities are optimized, the authors performed an experiment on the 555.6 nm $(6s^2)\ ^1S_0(F=5/2)-(6s6p)^3P_1(F=5/2)$ transition of nuclear spin 5/2 $^{173}$Yb. Their excitation pulses were generated by acousto-optically gating a cw ring dye laser. Pulses 1 and 3 were circularly polarized with negative helicity, while pulse 2 had the opposite helicity. The pulses were collimated (1.5 mm diameter) and colinear as they traversed the Yb vapor region. An acousto-optic modulator was employed after the Yb cell to pass the excitation pulses while deflecting the CORE signal onto a photomultiplier tube detector. The Yb cell was held at a temperature (500° C.) which provided a 40% weak signal optical absorption. A highly homogeneous magnetic field (70 G) oriented antiparallel to the pulse propagation direction was applied which split the upper state Zeeman levels, but left the ground-state nuclear Zeeman levels nearly degenerate. Under these conditions, the pulses excited various three-level systems where |a> and |b> (ground-state nuclear Zeeman levels) differ in $m_I$ by 2, and |c> (radiative lifetime 875 ns) is an excited-state Zeeman level. CORE signal shapes were recorded by digitizing the output of a boxcar integrator. Roughly $10^5$ signals were sampled for each wveform recorded. Excitation pulses, whose intensities (typically 400 mW/cm$^2$) were set to optimize the CORE signal intensity, were monitored on a fast photodiode and recorded as described above. Taking relaxation into account, the observed CORE signals ranged from 0.1% to 0.4% as intense as the excitation pulses. The total duration of a single experiment (pulse 1 to the CORE signal) was typically 3 μs.

Figure 7:
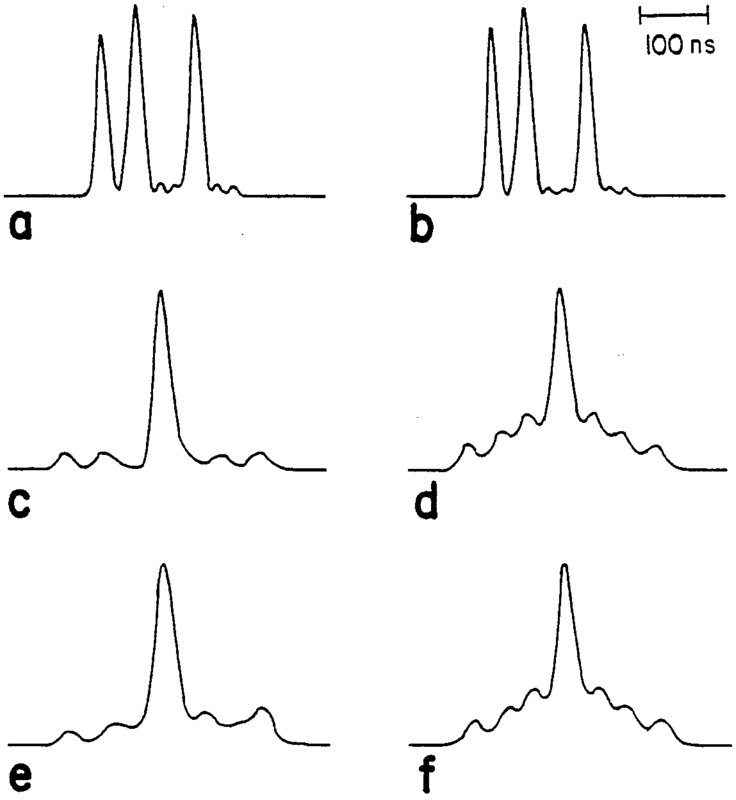
FIGS. 7, 8, 9, show intensity profiles related to cross correlation experiments.

The article describes experiments (FIGS. 7–9) in which pulse 2 was made temporally short and hence, according to Eq. (1) the CORE signal is expected to approximate a cross correlation between the envelopes of pulses 1 and 3. FIGS. 7(*a*) and 7(*b*) show respectively the profiles of pulses 1 and 3 in a case when they were made nearly identical. (All profiles shown are intensity profiles. In calculations, the authors assumed that the electric field is given by the square root of the intensity.) FIGS. 7(*c*) and 7(*d*) show, respectively, the observed CORE signal and the squared cross correlation of pulses 1 and 3.

As anticipated, FIGS. 7(*c*) and 7(*d*) are not identical. High excitation pulse intensities and non-negligible duration for pulse 2 (which has a duration comparable to a subpulse of pulse 1 or 3) are assumed responsible. To predict CORE shapes in the presence of intense excitation pulses, the authors performed numerical integrations of the undamped optical Bloch equations. Results obtained for pulses comparable to those actually employed are shown in FIG. 7(*e*). Exact agreement is not expected because of the variation of excitation-pulse intensity across the spatial profile of the beams and because the authors excited several nonequivalent three-level systems (with different transition rates) in the experiment. Furthermore, the authors' numerical calculation did not take account of absorption or propagation effects. In the case of a very short pulse 2 and small area (e.g., $\frac{1}{3}$ radian) excitation pulses, numerically calculated CORE signals, FIG. 7(*f*), agree with those expected on the basis of Eq. (1) [i.e., FIG. 7(*d*)].

Figure 8:
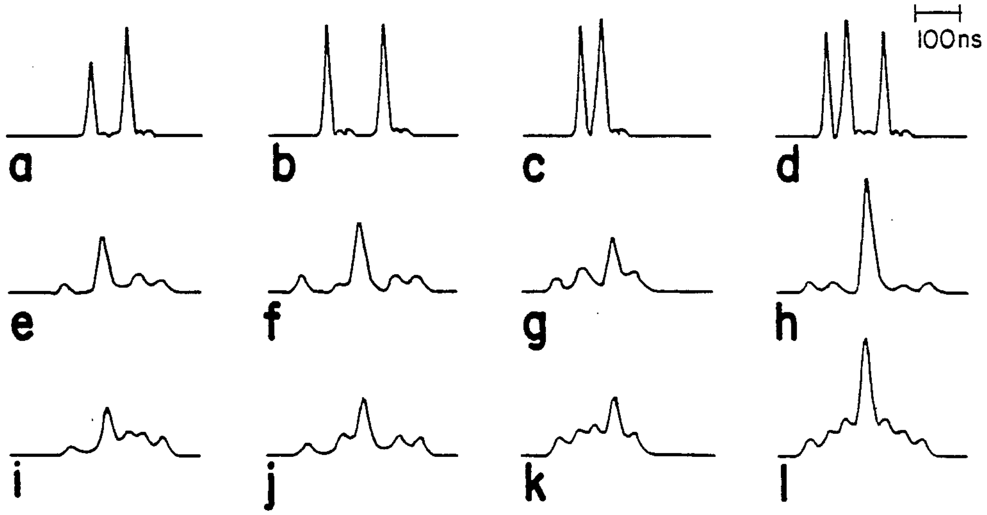

While leaving the shapes of pulses 1 and 2 unchanged, the authors turned off various subpeaks in pulse 3 [see FIGS. 8(*a*)–8(*d*)]. Corresponding observed CORE signals are shown in FIGS. 8(*e*)–8(*h*). Squared cross correlations of pulse 1 [FIG. 8(*a*)] and the corresponding pulse 3 are shown in FIGS. 8(*i*)–8(*l*). With a few exceptions, observed signals are qualitatively similar to the cross correlations. Importantly the peak CORE intensity drops significantly when pulses 1 and 3 are not identical, including a reduced correlation of their temporal waveforms.

Figure 9:
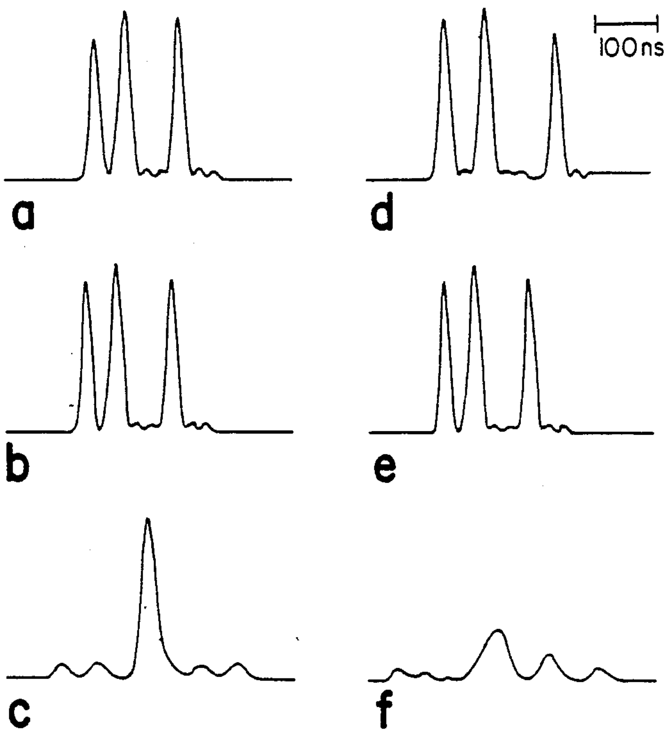

In FIGS. 9(*a*)–9(*c*) the authors reproduced FIGS. 7(*a*)–7(*c*), respectively. FIGS. 9(*d*)–9(*f*) show successively pulse 1 (modified by increasing the spacing between adjacent subpeaks), pulse 3, and the resulting observed CORE signal. Note that the strong autocorrelation peak characteristic of nearly identical excitation profiles is essentially gone in FIG. 9(*f*).

Figure 10:
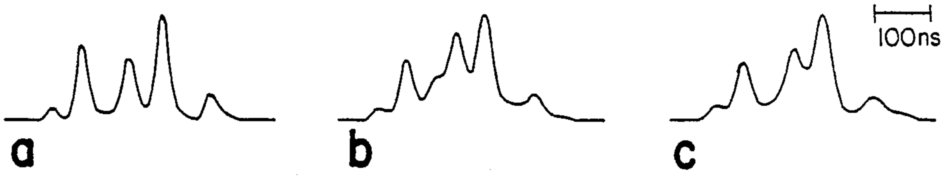
FIG. 10 shows intensity profiles related to a convolution experiment.

When the shapes of pulses 1 and 2 are interchanged so that pulse 1 is short, the CORE signal should represent a convolution of the envelopes of pulses 2 and 3. With pulse 2 [3] having the shape shown in FIGS. 7(*a*) [7(*b*)], we obtained the CORE signal shown in FIG. 10(*a*). The relevant squared convolution function is shown in FIG. 10(*b*), and the numerically calculated CORE shape expected for excitation pulses of the approximate area used is shown in FIG. 10(*c*).

In one application of such optical convolution, two digitally encoded optical signals can be subjected to mixed binary multiplication at extremely high speeds. In a mixed binary representation of a number, each of the bit values in the binary number may be other than either 0 or 1, e.g., 2. For example a mixed binary representation of decimal 16 is $312_{MB}=(3\times4)+(1\times2)+(2\times1)$.

Figure 3:
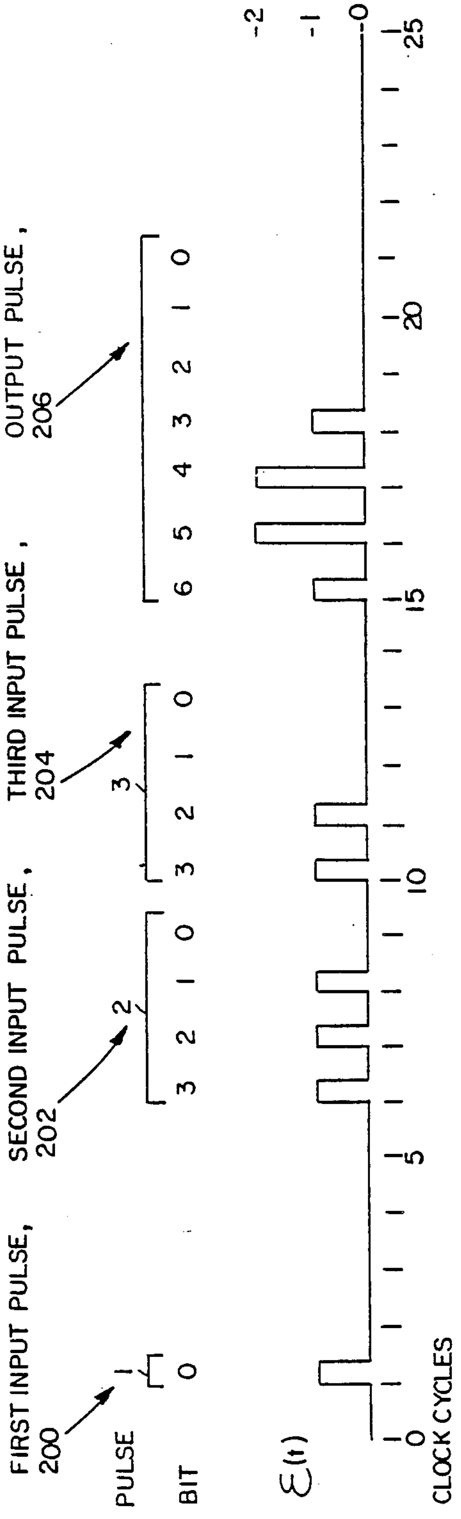
FIGS. 3, 4 are time charts of pulses (not to scale) used in multiplying two or three values.

For example, referring to FIG. 3 (in which time passes from left to right and clock ticks are indicated along the horizontal axis), to multiply $14\times12=168$, the first input pulse 200 is a short "1" bit at clock tick 1. The second input pulse 202 is a "1110" bit sequence that begins at clock tick 6 and represents decimal 14. The third input pulse 204 is a "1100" bit sequence that begins at clock tick 10 and represents decimal 12. The output pulse 206 is a seven-bit sequence $1221000_{MB}$ that in mixed binary represents the result 168. The actual output pulse sensed by the detector would be the square of the output pulse shown, unless homodyne detecting were used. Also the actual output pulse would be several orders of magnitude smaller than as shown, but the relative bit levels would be the same.

Figure 4:
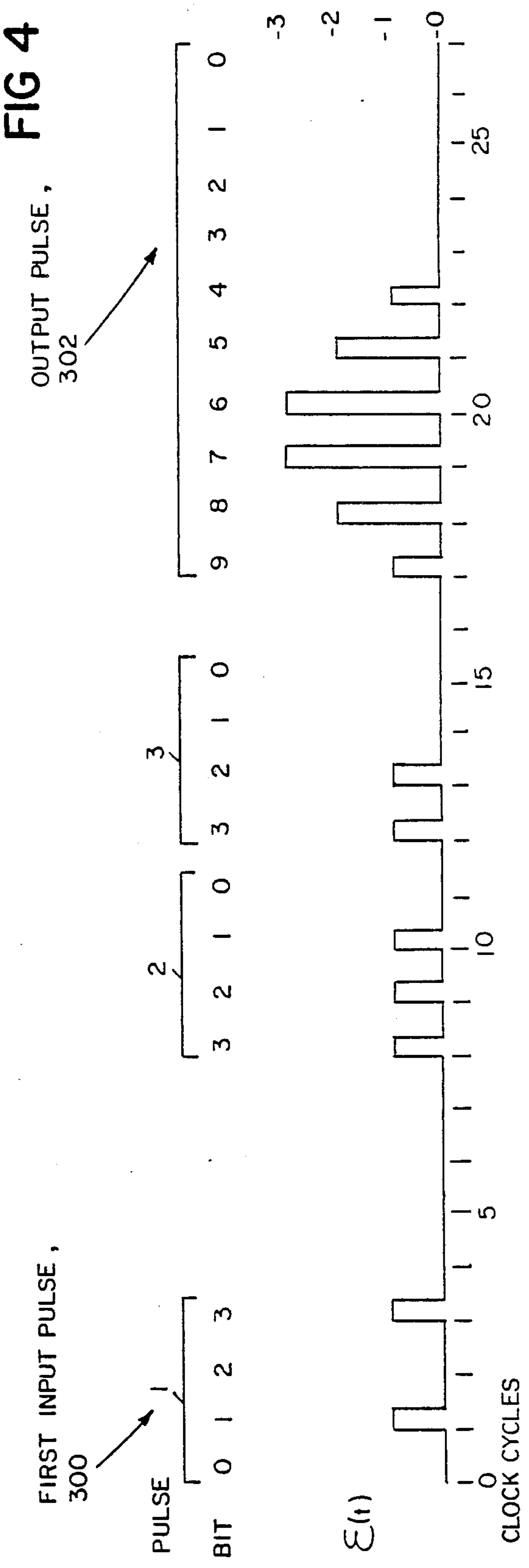

Referring to FIG. 4, three numbers can be multiplied in a similar manner by encoding the third number in the first pulse 300 in a temporally reversed binary fashion, e.g., decimal 10=reversed binary 0101. This time the output pulse sequence 302 is $1233210000_{MB}=1680=10\times14\times12$ as desired. Referring again to FIG. 1, the multiplication is accomplished by loading the three numbers to be multiplied into information segments A, B, and C (FIG. 1). The speed of multiplication is limited only by the inhomogeneous bandwidth of the emitting material.

Other embodiments are within the following claims.

A diode laser could replace the tunable dye laser, and then barium vapor in a sapphire cell could replace the ytterbium oven. A diode laser can be modulated directly without the need for an acousto-optic modulator. Material transitions corresponding to different resonant frequencies can be excited by using more than one diode laser, each operating independently at one of the needed freqencies.

Other inhomogeneously broadened emitting materials could also be used, e.g., a solid such as a Europium doped crystal matrix, in which case the inhomogeneously broadened bandwidth would be even wider than in $^{174}$Yb (in which it is about 1 GHz.).

The intensity of the information pulses can vary but must be small enough (e.g., 400 mW/cm$^2$ in the case of $^{174}$Yb) to transfer no more than a fraction of the population at any given frequency in one terminal level of the excited transition to the other terminal level.

The bandwidth of the laser can be broadened to produce essentially incoherent light permitting the intensity o the first three pulses to be increased, thus enhancing the output pulse intensity without saturating the emitting material. The intensity wveform level of the output pulse would then correspond directly to the cross-correlation or convolution or successive application of convolutions and/or correlations of the input information pulses, rather than to its square.

The time dependent information can be encoded in the two information pulses by techniques other than amplitude modulation, for example phase modulation.

The input pulses can be spatially differentiated rather than being delivered in the same direction; then the emitted pulse will appear at a particular angle isolated from other input signals and can be easily detected. The output signal must be phase-matched in a known manner. Spatial differentiation will cause some signal reduction in gas phase materials but not in solids.

The magnetic field need not be applied to split the ytterbium excited states. Alternatively, the ytterbium oven can be shielded with mu-metal and each of the excited Zeeman substates can be addressed by appropriate polarization of the three pulses.

The output pulse could be detected by homodyne detection in which it would be mixed with a phase coherent laser field of the same frequency. In that technique, the electric field (rather than the intensity which is the square of the electric field) is measured as a function of time.

The boxcar averager could be replaced by high-speed electronics which could derive the time-dependent waveform of a single emitted pulse.

The input pulses could be appropriately polarized and the detector could be preceded by a polarization selective filter that would be selective to the output pulse's polarization.

In applications where a single short control pulse is undesirable, a pair of linearly frequency chirped pulses may be substituted. The pulses should be chirped over the same bandwidth that the control pulse otherwise would uniformly excite, and the second chirped pulse should have a chirp rate twice that of the first. The chirped pulses occur in the temporal input sequence at the time otherwise occupied by the control pulse. Their total duration may be up to those of normal information pulses. The end of the second chirped pulse should precede any subsequent information pulse by at least its own duration. Using long chirped pulses lowers the laser intensity required to transfer about one half of the atomic state populations from one level to another which is roughly appropriate for the control pulse.

Figure 5:
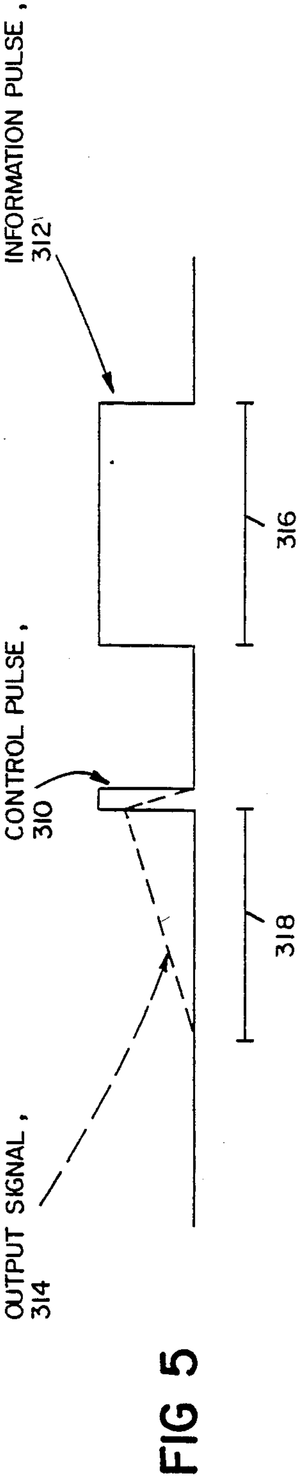
FIGS. 5, 6 are time charts of pulses (not to scale) used in performing auto-correlation and auto-convolution.
Figure 6:
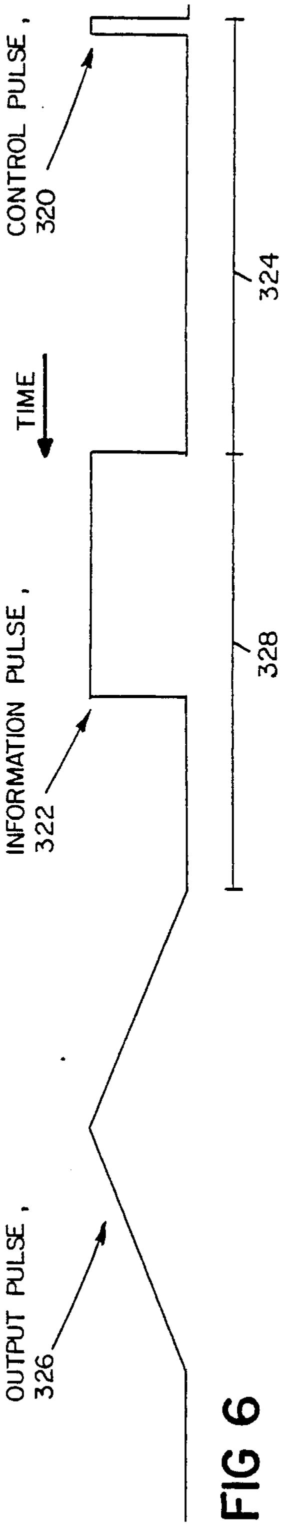

By applying a control pulse and a single information pulse, both resonant with the same transition, an output signal representing the convolution (half the cross-correlation—i.e., $t>0$) of the information pulse with itself will be generated if the control pulse is temporally first (second). Referring to FIG. 5, in the case of auto-correlation, the control pulse 310 follows the information pulse 312, and the output signal 314 follows immediately after the control pulse 310. The duration 318 of the output pulse is essentially the same as the duration 316 of pulse 312. Only half the auto-correlation ($t>0$) is emitted, but since it is temporally symmetrical, this is inconsequential. Referring to FIG. 6, in the case of auto-convolution, the control pulse 320 precedes the information pulse 322 by a delay 324. The full auto-convolution output pulse 326 is emitted after a delay 328 following the beginning of the second pulse 322, that is equal to the delay 324. Output pulses 326 is twice as long as input pulse 322. To avoid having pulse 326 overlap pulse 322, delay 324 must be no smaller than the length of pulse 322.

The use of coupled transitions having inhomogeneous broadening which is correlated but of different bandwidths can be employed to change the time scale associated with the output signal or input pulses.

Input pulses sequences containing various numbers of pulses can be employed. The output signal will represent a sequence of cross-correlation and/or convolution operations performed on the input pulses.

More than 3 binary temporally encoded information pulses can be employed. The output signal will represent the product value of all the input values in a mixed binary form. In the case of multiplication, the temporal encoding need not be binary. The inputs can be in mixed binary and have positive or negative (180° out of phase) values. The input information values can be encoded in any base system, i.e., mixed trinary, mixed decimal, etc.

All input pulses could be made resonant with a single transition. In this case, spectral information is stored, during the interval between pulses two and three, in the spectral distribution of population associated with terminal levels of the transition. Alternatively, transitions could be chosen which lead to the storage of spectral information in ground-state Zeeman coherences. In both of these cases, information may be stored for relatively long periods.

What is claimed is:

1. Apparatus for performing the operations of cross-correlation or convolution on one or more segments of information, comprising a source of optical radiation, a means for modulating said optical radiation to produce one or more information input pulses that are time varying respectively in accordance with said one or more segments of information, a sample of material which emits cooperatively enhanced optical radiation subsequent to excitation by pulses of optical radiation, means for exposing said material to said information pulses to stimulate said cooperatively enhanced optical radiation, and means for detecting said cooperatively enhanced optical radiation as a representation of the result of said cross-correlation or convolution operations.

2. The apparatus of claim 1 wherein said material has at least one inhomogeneously broadened optical transition, at least one of said transitions being an absorption line.

3. The apparatus of claim 2 wherein said material has a plurality of said inhomogeneously broadened optical transitions that are coupled, and said transitions have correlated inhomogeneous broadening mechanisms and are of substantially the same bandwidth.

4. The apparatus of claim 3 wherein there is a time sequence of three said pulses, and the temporally first and third pulses excite one said transition, and the temporally second pulse excites a second coupled said transition, said cooperatively enhanced optical radiation occurring on said second transition.

5. The apparatus of claim 2 wherein each said information pulse is resonant with one of said transitions and has time variations whose frequency components fall entirely within the inhomogeneous transition bandwidth of the resonant said transition.

6. The apparatus of claim 2 wherein said input pulses occur in a time sequence and the temporally first said input pulse is resonant with one of said absorption lines.

7. The apparatus of claim 2 wherein said material has homogeneous transition bandwidths within the bandwidths of said inhomogeneous transitions.

8. The apparatus of claim 2 wherein there are three said pulses which excite the same said transition, said cooperatively enhanced optical radiation occurring on said same transition.

9. The apparatus of claim 1 wherein said means for modulating further produces a temporally brief control input pulse which is resonant with one of said inhomogeneously broadened transitions, and is sufficiently short to uniformly excite all atoms which interact with said information pulses, and said means for exposing all exposes said material to said control pulse.

10. The apparatus of claim 9 wherein there are two said information pulses, and said control pulse is shorter than the shortest temporal feature of any of said information pulses that are resonant with the same transition as said control pulse.

11. The apparatus of claim 10 wherein said input pulses excite transitions in said material to cause said cooperatively enhanced optical radiation to be emitted.

12. The apparatus of claim 10 wherein said means for exposing exposes said material to said information and control pulses in a predetermined sequence.

13. The apparatus of claim 12 wherein said control pulse appears temporally first in said predetermined sequence, and said cooperatively enhanced optical radiation represents said convolution.

14. The apparatus of claim 12 wherein said control pulse appears second or third in said predetermined sequence, and said cooperatively enhanced optical radiation represents said cross-correlation.

15. The apparatus of claim 12 wherein the time interval between the beginning of the temporally first input pulse and the end of the temporally second input pulse does not substantially exceed the homogeneous dephasing time associated with the transition excited by the temporally first said input pulse.

16. The apparatus of claim 12 wherein in said predetermined sequence the temporarily third said input pulse follows after the temporally second said input pulse with a delay of no more than the time it takes for frequency spectrum relaxation in said material.

17. The apparatus of claim 1 further comprising means for discriminating said cooperatively enhanced optical radiation from noise radiation.

18. The apparatus of claim 17 wherein said discriminating means comprises means for selectively circularly polarizing said input pulses and a polarizing filter for filtering said cooperatively enhanced radiation.

19. The apparatus of claim 1 wherein said modulation is amplitude modulation.

20. The apparatus of claim 1 wherein said information segment is time varying.

21. The apparatus of claim 1 wherein said optical radiation is coherent.

22. The apparatus of claim 1 wherein said optical radiation source comprises a laser.

23. The apparatus of claim 1 wherein said information segments comprise values, and said cooperatively enhanced optical radiation comprises an output pulse having a time-dependent waveform corresponding to a product value that is the arithmetic product of said values.

24. The apparatus of claim 23 wherein said pulses are binary encoded to represent said information segments, and said output pulse time-dependent waveform represents said product value in mixed binary form.

25. The apparatus of claim 23 wherein there are two said values.

26. The apparatus of claim 23 wherein there are at least three said values.

27. The apparatus of claim 1 wherein there is one said information input pulse and said cooperatively enhanced optical radiation is indicative of the auto-correlation or auto-convolution of said information pulse.

28. The apparatus of claim 27 wherein said modulating means further produces a temporally brief control input pulse that precedes said information input pulse, and said optical radiation is indicative of said auto-convolution.

29. The apparatus of claim 27 wherein said modulating means further produces a temporally brief control input pulse that follows said information input pulse, and said optical radiation is indicative of said auto-correlation.

30. The apparatus of claim 1 wherein said means for modulating produces two successive linearly frequency chirped pulses whose bandwidth is sufficiently broad to uniformly excite atoms within said material.

31. The apparatus of claim 30 wherein the second said chirped pulse has a chirp rate twice that of the first said chirped pulse.

32. The apparatus of claim 1 wherein said optical radiation is incoherent.

33. A method for performing the operations of cross-corrrelation or convolution on one or more segments of information, comprising modulating a source of optical radiation to produce one or more information input pulses that are time varying respectively in accordance with said one or more segments of information, providing a sample of material which emits cooperatively enhanced optical radiation subsequent to excitation by pulses of optical radiation, exposing said material to said information pulses to stimulate said cooperatively enhanced optical radiation, and detecting said cooperatively enhanced optical radiation as a representation of the result of said cross-correlation or convolution operations.

34. The method of claim 33 wherein said material has at least one inhomogeneously broadened optical transition, at least one of said transitions being an absorption line.

35. The method of claim 34 wherein said material has a plurality of said inhomogeneously broadened optical transitions that are coupled, and said transitions have correlated inhomogeneous broadening mechanisms and are of substantially the same bandwidth.

36. The method of claim 34 wherein each said information pulse is resonant with one of said transitions and has time variations whose frequency components fall entirely within the inhomogeneous transition bandwidth of the resonant said transition.

37. The method of claim 34 wherein said input pulses occur in a time sequence and the temporally first said input pulse is resonant with one of said absorption lines.

38. The method of claim 34 wherein said material has homogeneous transition bandwidths within the bandwidths of said inhomogeneous transitions.

39. The method of claim 34 wherein said modulating step further comprises producing a temporally brief control input pulse which is resonant with one of said inhomogeneously broadened transitions, and is sufficiently short to uniformly excite all atoms which interact with said information pulses, and said exposing step also includes exposing said material to said control pulse.

40. The method of claim 34 wherein there are three said pulses which excite the same transition, said cooperatively enhanced optical radiation occurring on said same transition.

* * * * *

UNITED STATES PATENT AND TRADEMARK OFFICE
CERTIFICATE OF CORRECTION

PATENT NO. : 4,670,854

DATED : June 2, 1987

INVENTOR(S) : Thomas W. Mossberg et al.

It is certified that error appears in the above-identified patent and that said Letters Patent are hereby corrected as shown below:

Col. 2, line 32, "when" should be --When--;

Col. 3, line 9, "beam 13" should be --beam 14--;

Col. 4, line 32, "that" should be --than--;

Col. 6, line 1, the formula should read as follows:

--$E_\rho(r,t)=\varepsilon_\rho(t-\eta_\rho)\cos[\omega_o(t-\eta_\rho)]$,--;

Col. 6, lines 4-5, the formula should read as follows:

--$\eta_\rho=(\hat{K}_\rho\cdot r/c)+t_\rho$, where $\hat{K}_\rho$--;

Col. 6, line 14, "$E_\rho(\Omega)$" should be --$E_\rho(\omega)$--;

Col. 7, line 8, "wveform" should be --waveform--;

Col. 8, line 62, "o" should be --of--;
Col. 8, line 64, "wveform" should be -- waveform --.

Signed and Sealed this

Twenty-sixth Day of April, 1988

*Attest:*

DONALD J. QUIGG

*Attesting Officer* *Commissioner of Patents and Trademarks*